United States Patent
Hamdoon et al.

(10) Patent No.: US 9,981,575 B2
(45) Date of Patent: May 29, 2018

(54) ARMREST SUBSTRATE HAVING DETACHABLE ELONGATED SUPPORT BANDS

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Bakhtyar Baig, Canton, MI (US); Linh Doan, Belleville, MI (US); Bhaskara Rao Pamarthi, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/251,600

(22) Filed: Aug. 30, 2016

(65) Prior Publication Data
US 2016/0368402 A1    Dec. 22, 2016

Related U.S. Application Data

(62) Division of application No. 14/246,243, filed on Apr. 7, 2014, now Pat. No. 9,463,723.

(51) Int. Cl.
*A47C 1/03* (2006.01)
*A47C 7/54* (2006.01)
(Continued)

(52) U.S. Cl.
CPC ....... *B60N 2/42709* (2013.01); *B60N 2/4235* (2013.01); *B60N 2/466* (2013.01);
(Continued)

(58) Field of Classification Search
CPC ........ B60R 21/0428; B60R 2021/0414; B60N 2/46; B60N 2/466; B60N 2/42; B60N 2/4235; B60N 2/42709; B60N 2/02; B60N 2/462; B60N 2/4606; B60N 2/4666; A47C 1/03; A47C 7/54; A47C 7/543; A47C 7/546; A47C 7/68; B29C 45/14778
See application file for complete search history.

(56) References Cited

U.S. PATENT DOCUMENTS

2,942,438 A    6/1960   Schmeling
3,362,749 A *  1/1968   Clement ................ B60N 2/466
                                                        267/95
(Continued)

*Primary Examiner* — Phi D A
(74) *Attorney, Agent, or Firm* — Vichit Chea; Price Heneveld LLP (57) ABSTRACT

A collapsible vehicle armrest includes an armrest substrate extending between a door frame and a door trim and defining an opening therebetween. The opening has a longitudinal axis substantially parallel with the door frame. A plurality of support bands extends co-planar across the opening and parallel with the longitudinal axis. A plurality of stubs extends across each gap defined between adjacent support bands. Each stub is free of alignment with each other of the plurality of stubs in a direction perpendicular to the plurality of support bands. A cover member extends over the armrest substrate and the plurality of support bands, wherein the cover member is vertically supported proximate the opening by the plurality of parallel support bands and the plurality of stubs.

19 Claims, 9 Drawing Sheets

(51) Int. Cl.
  *B60N 2/02* (2006.01)
  *B60N 2/427* (2006.01)
  *B60N 2/46* (2006.01)
  *B60N 2/42* (2006.01)
  *A47C 7/68* (2006.01)

(52) U.S. Cl.
  CPC .................. *B60N 2/78* (2018.02); *A47C 7/54* (2013.01); *A47C 7/543* (2013.01); *A47C 7/68* (2013.01)

(56) References Cited

U.S. PATENT DOCUMENTS

| | | | |
|---|---|---|---|
| 3,387,881 | A | 6/1968 | Stepanek et al. |
| 3,743,234 | A | 7/1973 | Pietrzak |
| 4,783,114 | A | 11/1988 | Welch |
| 5,172,311 | A | 12/1992 | Reinhart et al. |
| 5,181,759 | A | 1/1993 | Doolittle |
| 5,445,430 | A | 8/1995 | Nichols |
| 5,527,084 | A | 6/1996 | Scherf |
| 5,803,415 | A | 9/1998 | Konishi et al. |
| 5,967,594 | A * | 10/1999 | Ramanujam ......... B60N 2/4626 280/751 |
| 6,068,320 | A | 5/2000 | Miyano |
| 6,142,563 | A * | 11/2000 | Townsend ........... B60N 2/4228 297/216.1 |
| 6,520,568 | B2 * | 2/2003 | von Holst ........... B60R 13/0225 280/748 |
| 6,893,077 | B1 | 5/2005 | DeJongh |
| 7,070,221 | B2 | 7/2006 | Cowelchuk et al. |
| 7,121,611 | B2 | 10/2006 | Hirotani et al. |
| 7,387,326 | B2 | 6/2008 | Osada |
| 7,503,621 | B2 | 3/2009 | Mani |
| 7,533,939 | B2 | 5/2009 | Fookes et al. |
| 7,614,703 | B2 | 11/2009 | Bergin |
| 7,641,284 | B2 | 1/2010 | Jones et al. |
| 7,658,436 | B2 | 2/2010 | Gilleo et al. |
| 7,681,939 | B2 | 3/2010 | Augustyn |
| 7,731,268 | B2 | 6/2010 | Motowski et al. |
| 7,775,584 | B2 | 8/2010 | Hughs, Jr. et al. |
| 7,794,009 | B2 | 9/2010 | Pinkerton et al. |
| 7,794,010 | B2 | 9/2010 | Saida et al. |
| 7,828,388 | B2 | 11/2010 | Thomas |
| 7,871,119 | B2 | 1/2011 | Schoemann et al. |
| 8,157,309 | B2 | 4/2012 | Ishikawa |
| 8,172,311 | B2 * | 5/2012 | Hughes, Jr. ............ B60N 2/466 296/1.09 |
| 8,424,954 | B2 | 4/2013 | Hall et al. |
| 8,740,287 | B2 | 6/2014 | Onda et al. |
| 9,114,773 | B2 * | 8/2015 | Sundararajan ...... B60R 21/0428 |
| 2007/0267910 | A1 | 11/2007 | Bergin |
| 2009/0146480 | A1 * | 6/2009 | Knowlden ........... B60N 2/4235 297/411.2 |
| 2012/0104823 | A1 | 5/2012 | Lai |
| 2012/0146381 | A1 | 6/2012 | Spooner et al. |

\* cited by examiner

ARMREST SUBSTRATE HAVING DETACHABLE ELONGATED SUPPORT BANDS

CROSS-REFERENCE TO RELATED APPLICATION

The present application is a divisional of U.S. patent application Ser. No. 14/246,243 filed Apr. 7, 2014, entitled ARMREST SUBSTRATE HAVING DETACHABLE ELONGATED SUPPORT BANDS, the entire disclosure of which is hereby incorporated herein by reference.

FIELD OF THE INVENTION

The present invention generally relates to vehicle armrests, and more specifically, a vehicle armrest substrate where at least a portion of the vertical support for the horizontal surface of the armrest is provided by selectively detachable and parallel support bands.

BACKGROUND OF THE INVENTION

Vehicles contain various styles of armrests within door assemblies and also within side panels, where no door is present. Various armrests can include additional cushioning and handles, as well as other features, such as storage compartments and cup holders. Because armrests project into the cabin space of the vehicle, they can present a potential hazard during a side-impact condition placed upon the vehicle. In such an impact, the armrest can be forced further into the cabin area as a result of the impact.

SUMMARY OF THE INVENTION

According to one aspect of the present invention, a collapsible vehicle armrest includes an armrest substrate extending between a door frame and a door trim and defining an opening therebetween. The opening has a longitudinal axis substantially parallel with the door frame. A plurality of support bands extends co-planar across the opening and parallel with the longitudinal axis. A plurality of stubs extends across each gap defined between adjacent support bands. Each stub is free of alignment with each other of the plurality of stubs in a direction perpendicular to the plurality of support bands. A cover member extends over the armrest substrate and the plurality of support bands, wherein the cover member is vertically supported proximate the opening by the plurality of parallel support bands and the plurality of stubs.

According to another aspect of the present invention, a collapsible vehicle armrest includes a flexible substrate defining parallel longitudinal slots. A plurality of stubs is disposed across each of the slots, wherein each of the plurality of stubs is positioned free of alignment with each other of the plurality of stubs in a direction perpendicular to the slots. An armrest substrate extends between a door frame and an interior door trim. The armrest substrate defines an opening. The flexible substrate spans across the opening in a direction parallel with the slots and a cover member extending over the armrest substrate and the flexible substrate. The cover member is vertically supported proximate the opening by the flexible substrate and the plurality of stubs.

According to another aspect of the present invention, a vehicle armrest includes an armrest substrate extending between a door frame and a door trim and defining an opening therebetween, parallel support bands extending co-planar across the opening and a plurality of stubs extending across each gap defined between adjacent parallel support bands, wherein each stub is free of alignment with each other of the plurality of stubs in a direction perpendicular to the parallel support bands.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
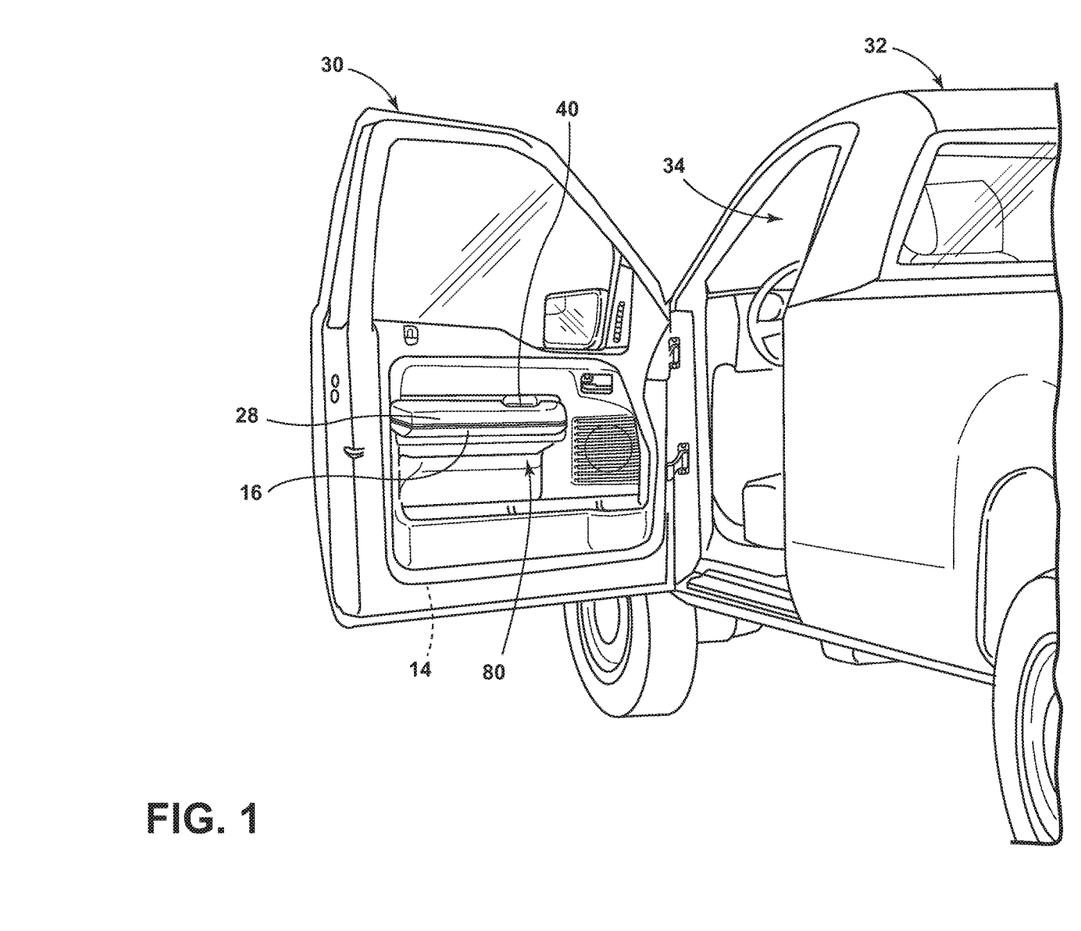
FIG. 1 is a rear side perspective view of a vehicle with a door in the open position and an embodiment of the parallel support band armrest substrate installed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
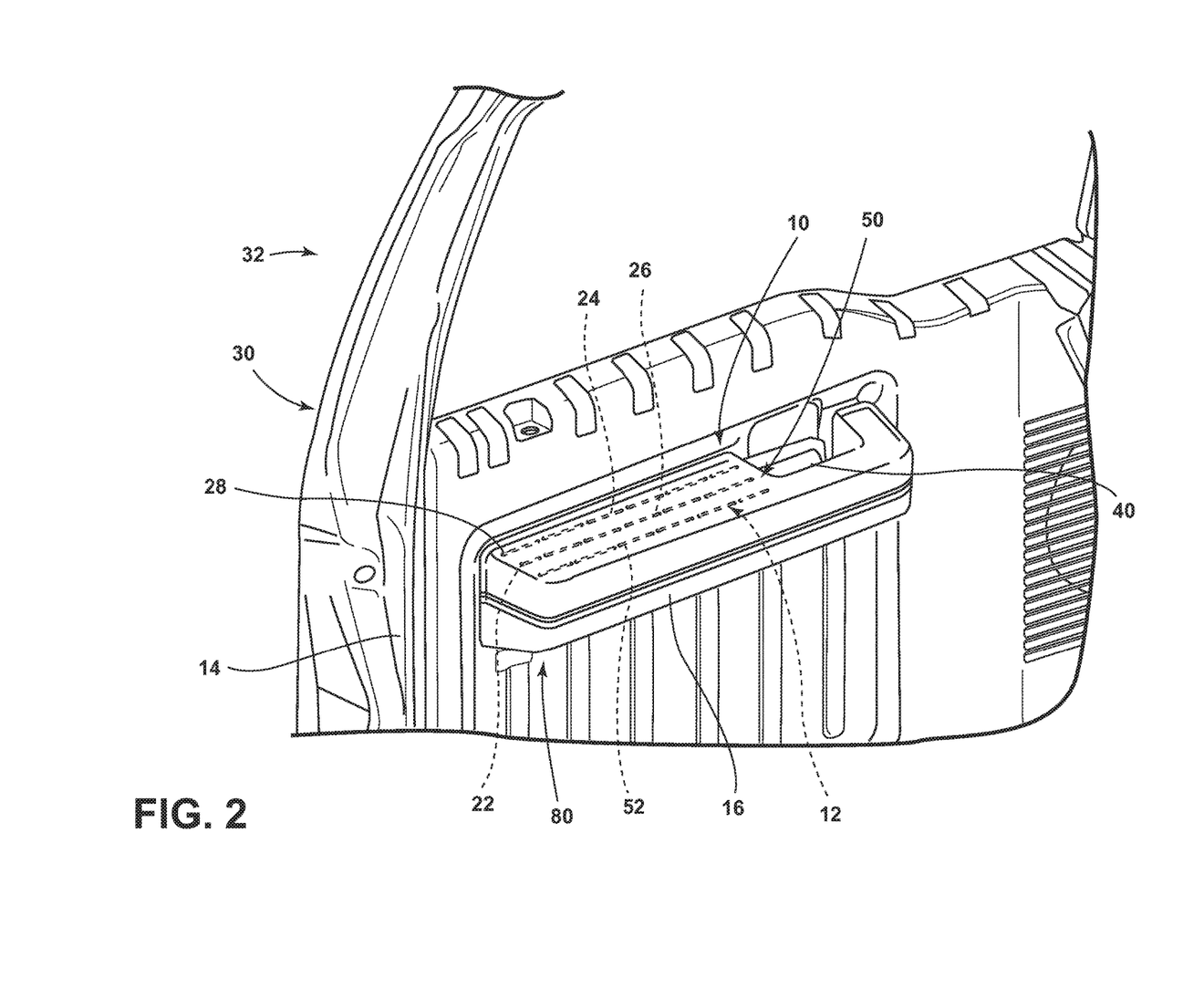
FIG. 2 is a top detailed perspective view of the vehicle door of FIG. 1.
Figure 3:
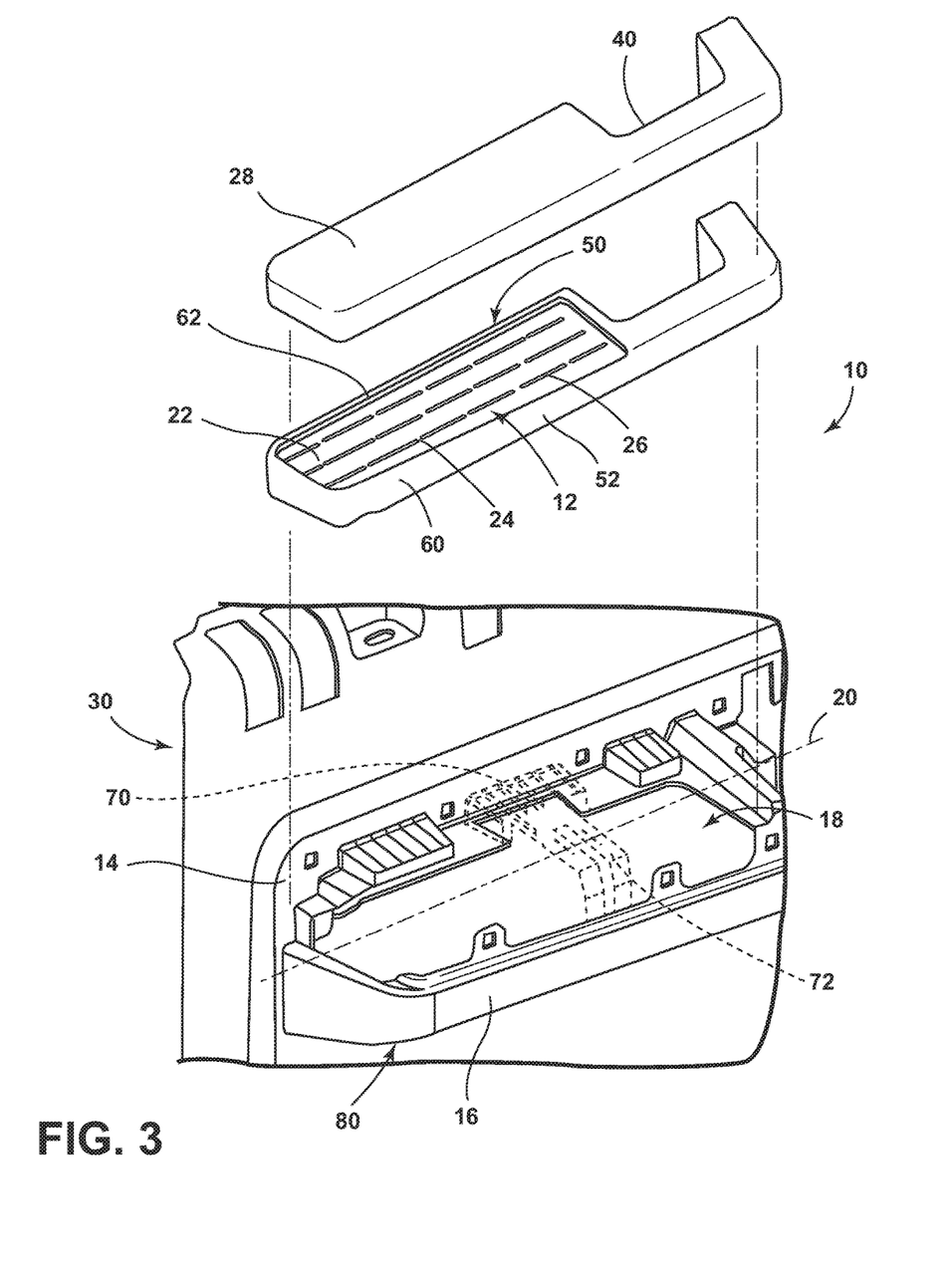
FIG. 3 is an exploded perspective view of the armrest of FIG. 2.

As shown in FIGS. 1-3, reference numeral 10 generally refers to a collapsible armrest 10 including an armrest substrate 12 extending between a door frame 14 and a door trim 16, where the door frame 14 and door trim 16 define an opening 18 therebetween. The opening 18 includes a longitudinal axis 20 positioned substantially parallel with the door frame 14. A plurality of support bands 22 extends co-planar across the opening 18 and parallel with the longitudinal axis 20. A plurality of stubs 24 extends across each gap 26 defined between adjacent support bands 22, wherein each stub 24 is free of alignment with each of the other of the plurality of stubs 24, in a direction perpendicular to the plurality of support bands 22. A cover member 28 extends over the armrest substrate 12 and the plurality of support bands 22. The cover member 28 is also vertically supported proximate the opening 18 by the plurality of support bands 22 and the plurality of stubs 24. The collapsible armrest 10 is generally disposed proximate a vehicle door 30 for a vehicle 32, wherein the collapsible armrest 10 extends at least partially into the passenger cabin 34 of the vehicle 32.

Referring again to FIGS. 1-3, in various embodiments, the armrest substrate 12 can include several parallel support bands 22 that define three gaps 26 therebetween, wherein the plurality of stubs 24 extends across each of the three gaps 26, as discussed above. In the various embodiments, the parallel support bands 22 can be made of polypropylene that is approximately 22% talc filled. In the various embodiments, it is contemplated that parallel support bands 22 will include a thickness that is greater than that of each of the plurality of stubs 24. By way of explanation, and not limitation, each of the parallel support bands 22 may have a thickness of approximately 4 mm, while each of the plurality of stubs 24 may have a thickness of approximately 3 mm and gaps 26 or slots may have a width of approximately 2.5 mm. Also, in various embodiments, the armrest substrate 12 can include up to four or more support bands 22 with up to three or more gaps 26. It should be understood that each of these dimensions is for explanation purposes only and greater or lesser thicknesses of the parallel support bands 22 and the stubs 24 is contemplated, as well as greater or lesser widths of each of the gaps 26 defined between the parallel support bands 22. Additionally, the armrest substrate 12 may have more or fewer support bands 22 and/or gaps 26.

Referring again to the embodiment illustrated in FIGS. 1-3, the collapsible armrest 10 can include various structural and utility features associated with the use of the vehicle door 30. Such features can include, but are not limited to, handles 40 defined within the collapsible armrest 10, cup holders, vehicle door controls, window controls, locks, and other various controls related to the function of the vehicle door 30.

Figure 4:
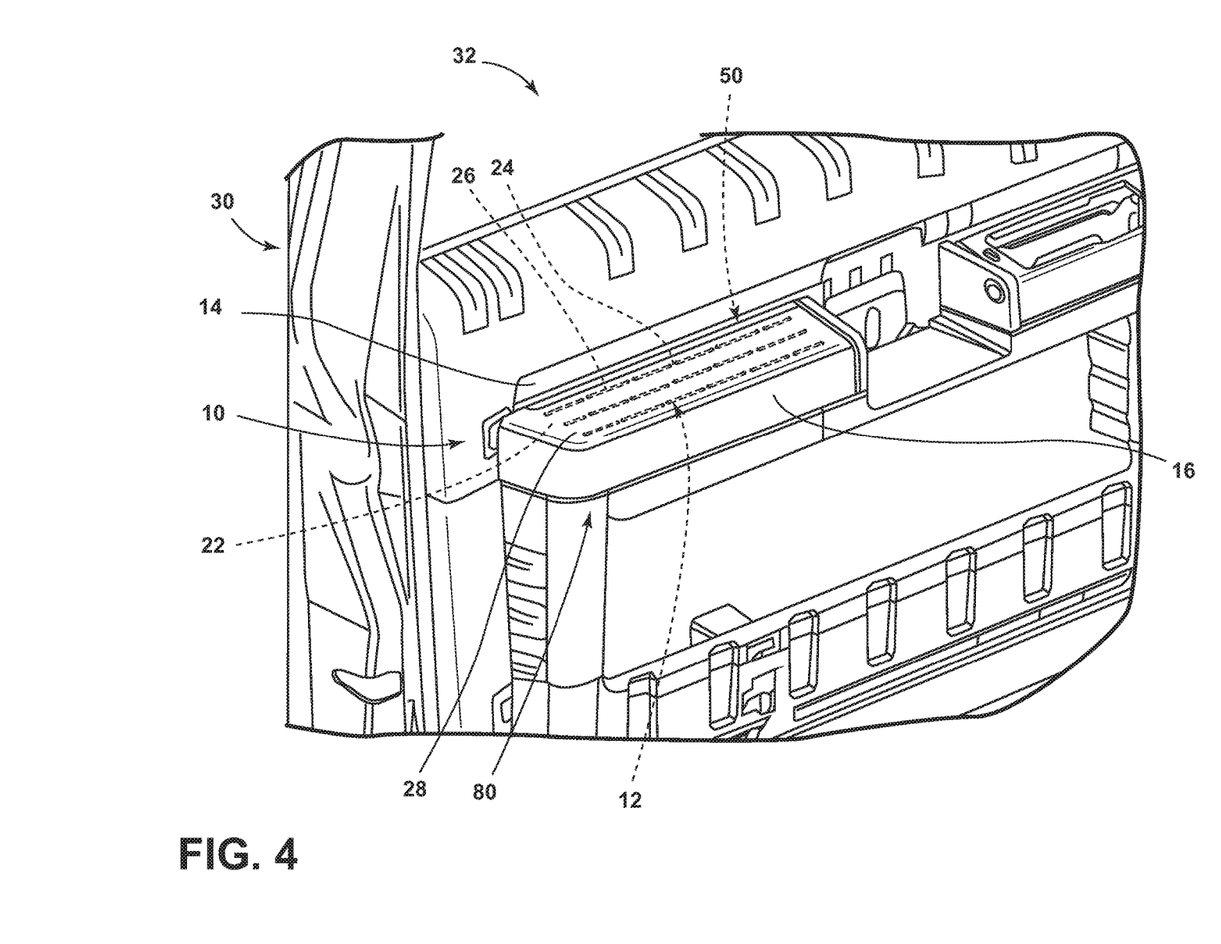
FIG. 4 is a top detailed perspective view of an alternate embodiment of a vehicle door incorporating the parallel support band substrate armrest.
Figure 5:
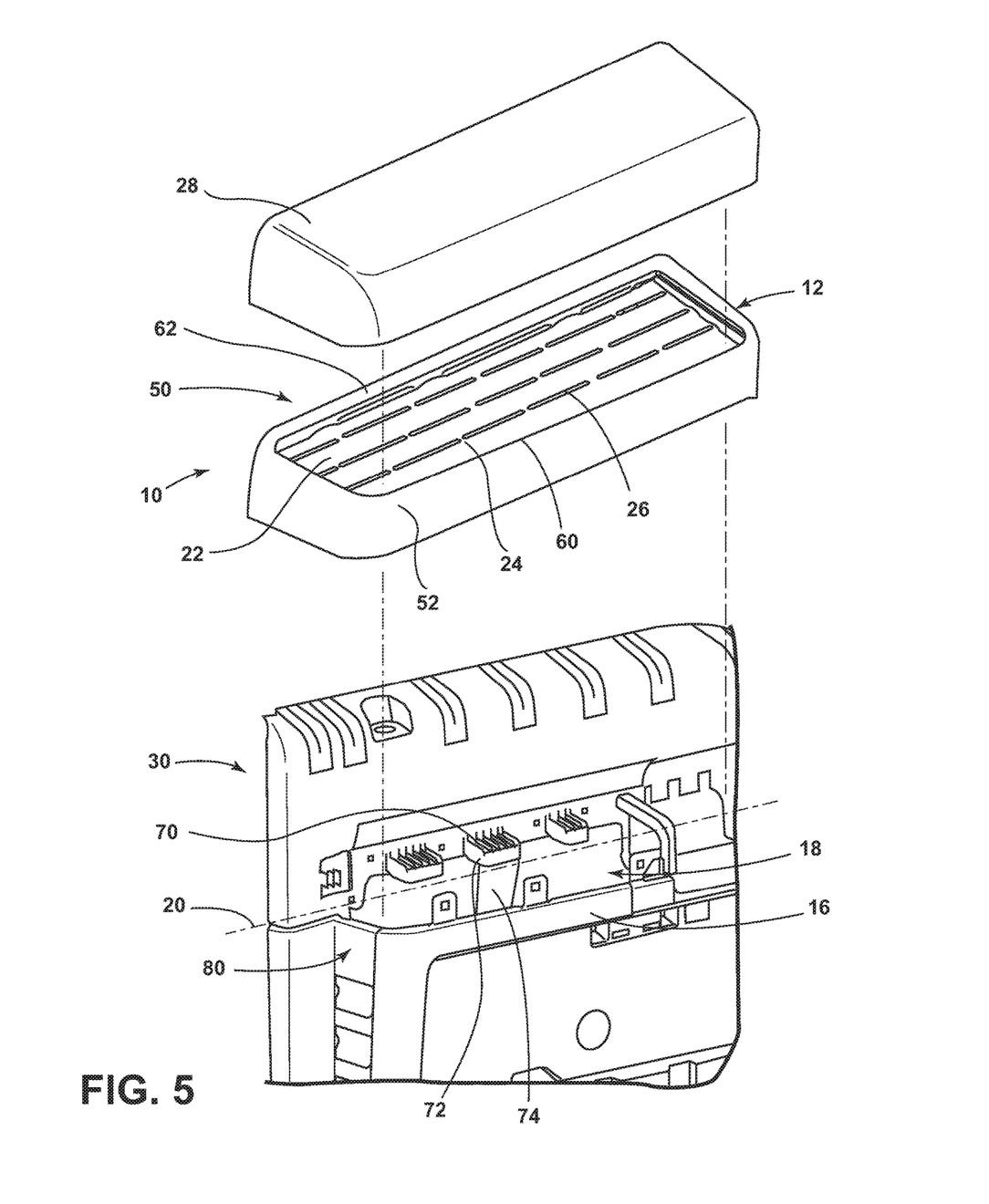
FIG. 5 is an exploded perspective view of the armrest of FIG. 4.
Figure 6:
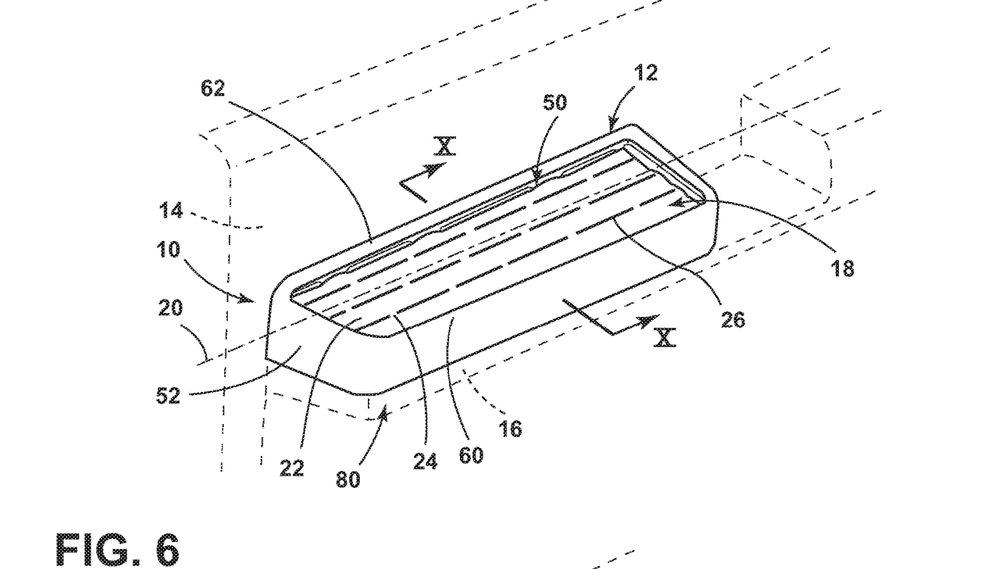
FIG. 6 is a detail perspective view of an alternate embodiment of the parallel support band substrate shown in a resting condition.
Figure 7:
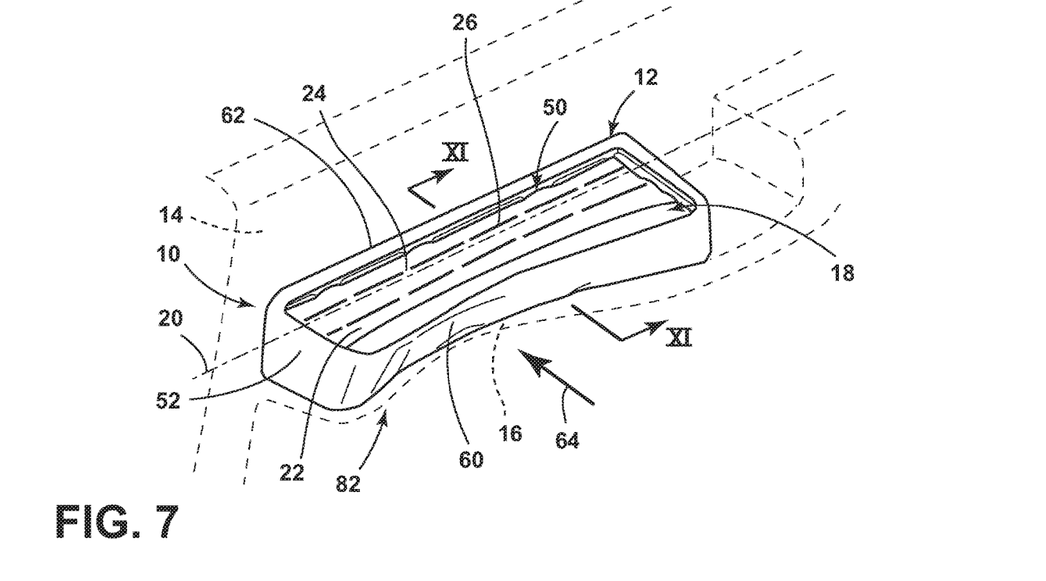
FIG. 7 is a top perspective view of the armrest substrate of FIG. 6 in a first compressed condition.
Figure 8:
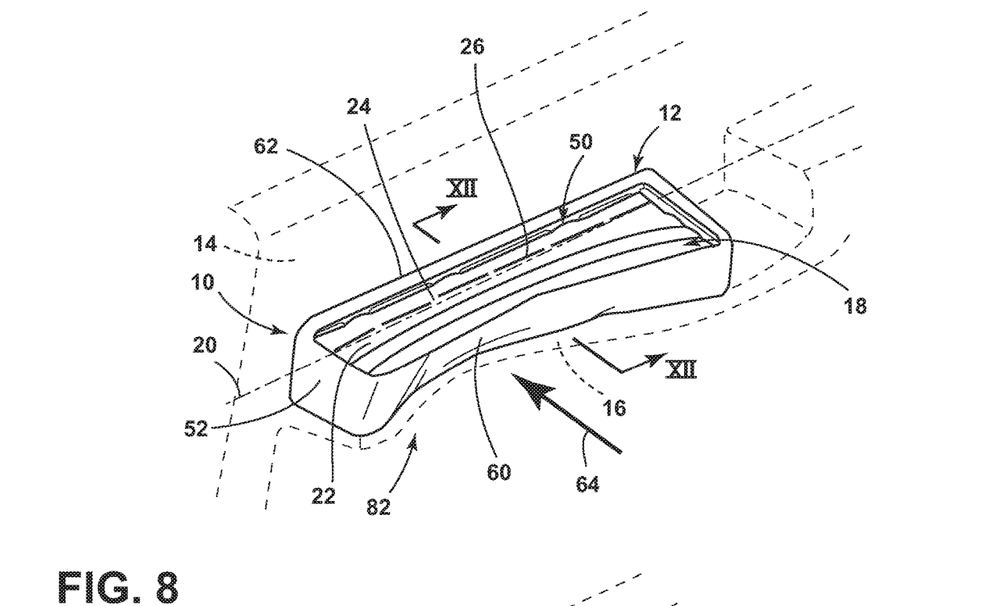
FIG. 8 is a top perspective view of the armrest substrate of FIG. 6 in a second more compressed state.
Figure 9:
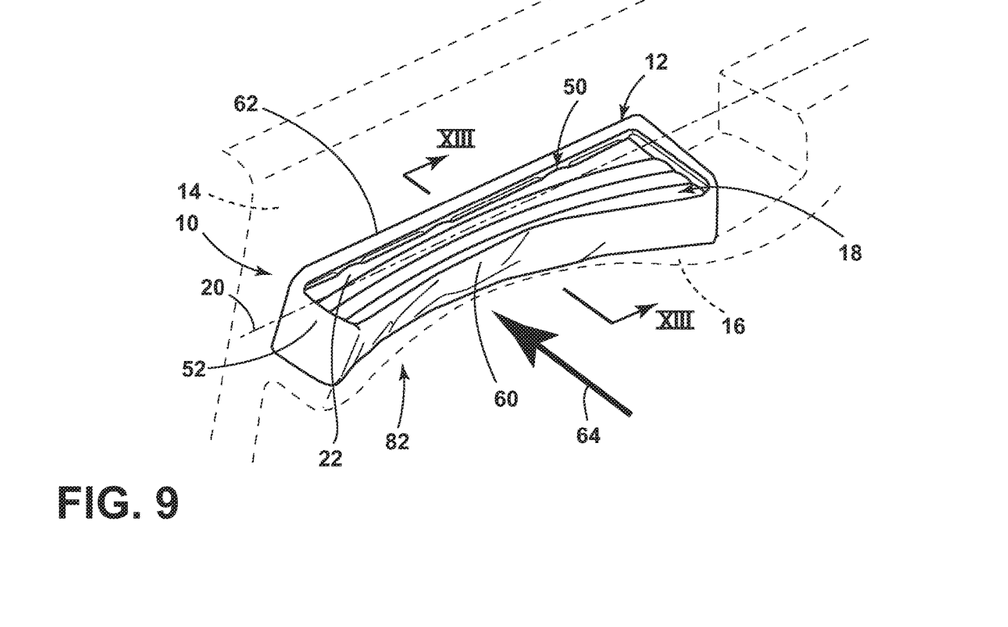
FIG. 9 is a top perspective view of the armrest substrate of FIG. 6 in a third further compressed state.
Figure 10:
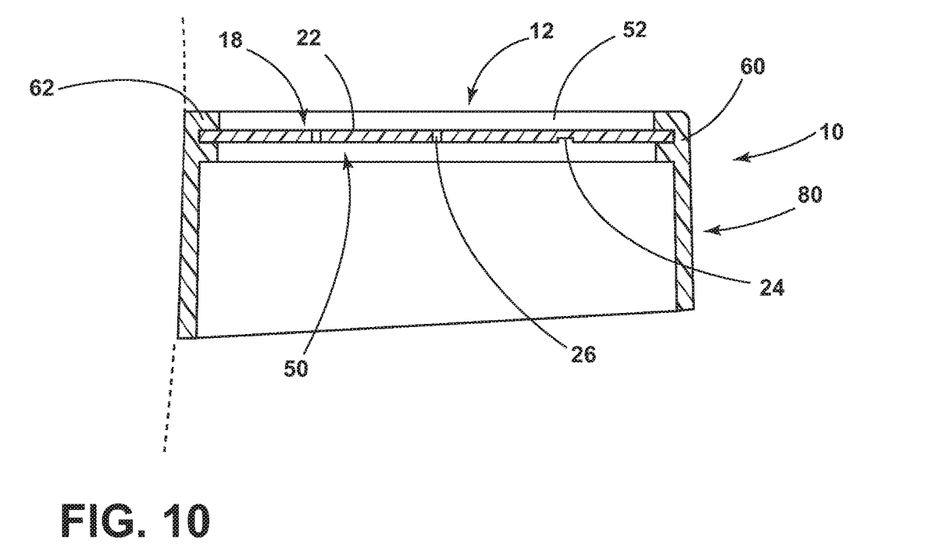
FIG. 10 is a cross-sectional view of the embodiment of FIG. 6 taken along line X-X.
Figure 11:
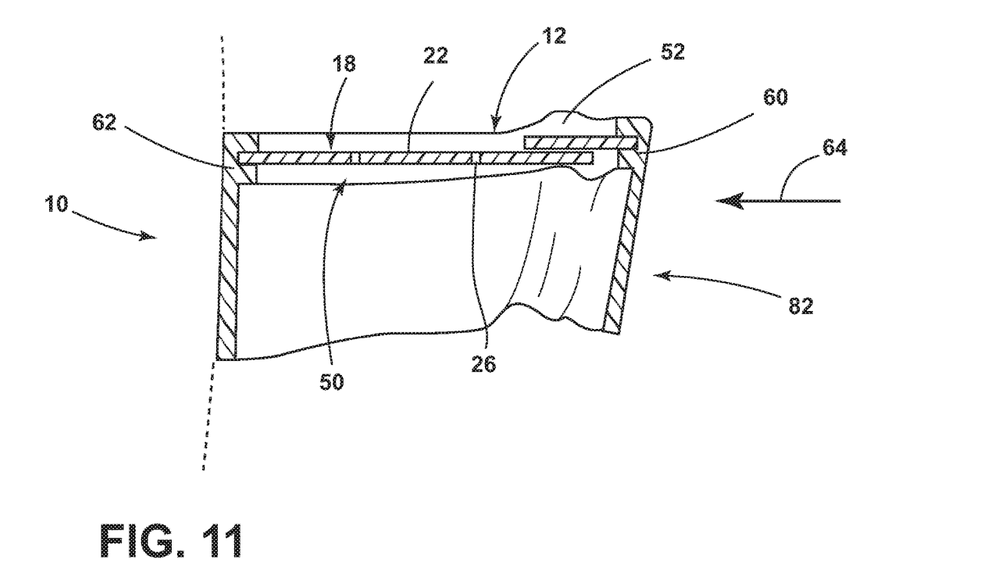
FIG. 11 is a cross-sectional view of the embodiment of FIG. 7 taken along line XI-XI.
Figure 12:
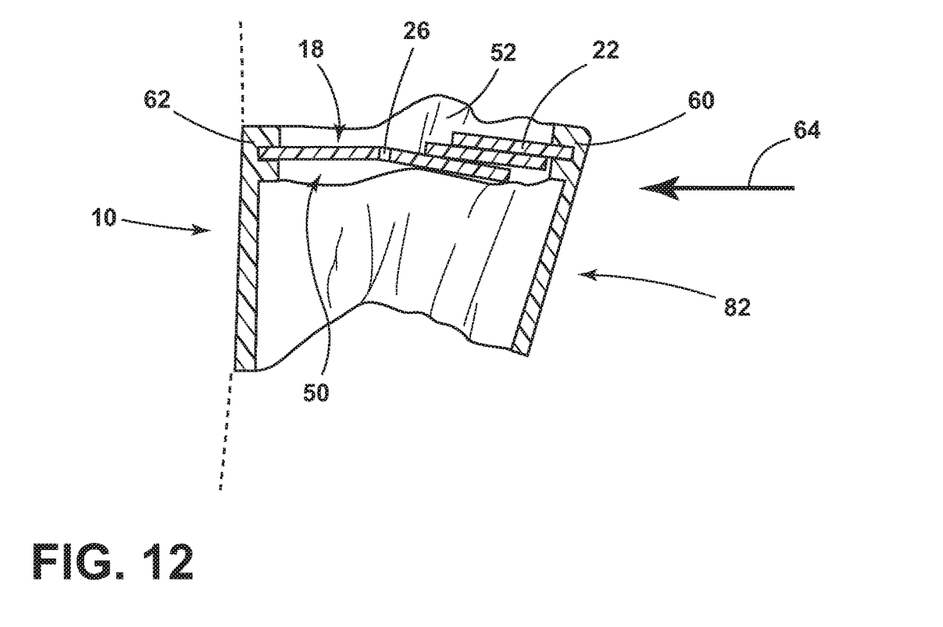
FIG. 12 is a cross-sectional view of the embodiment of FIG. 8 taken along line XII-XII.
Figure 13:
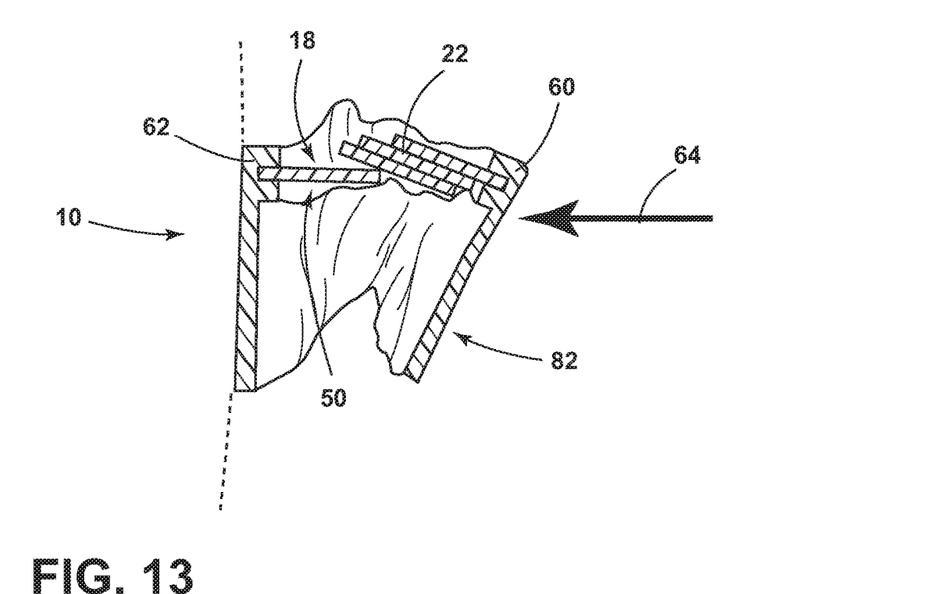
FIG. 13 is a cross-sectional view of the embodiment of FIG. 9 taken along line XIII-XIII

Referring now to the embodiment illustrated in FIGS. 4 and 5, the plurality of support bands 22 of the collapsible armrest 10 can define a flexible substrate 50 where the plurality of stubs 24 extend across parallel longitudinal gaps or slots 26 that are defined between adjacent support bands 22. As discussed above, each of the plurality of stubs 24 is disposed between the support bands 22 and across each of the longitudinal gaps 26. Each of the plurality of stubs 24 is positioned free of alignment with each of the other of the plurality of stubs 24 in a direction perpendicular to the longitudinal gaps 26. The armrest substrate 12 can also include a frame 52 that can be configured to extend from a portion of the door frame 14, which can include, but is not limited to, a sheet metal inner, a sheet metal outer, and other components. The frame 52 extends to the interior door trim 16, where the frame 52 of the armrest substrate 12 defines the opening 18 that the flexible substrate 50 can span across. It is contemplated that the opening 18, having a primary longitudinal axis 20, has the flexible substrate 50 spanned across, such that the longitudinal gaps 26 of the flexible substrate 50 are parallel with the primary longitudinal axis 20 of the opening 18, and such that the primary longitudinal axis 20 of the opening 18 is substantially parallel to the sheet metal inner of the door frame 14. In this manner, the flexible substrate 50 is spanned across the opening 18 such that lateral impact forces will be exerted upon the collapsible armrest 10 generally perpendicular to the longitudinal gaps 26. The cover member 28 of the collapsible armrest 10 extends over the frame 52 of the armrest substrate 12. In this manner, the cover member 28 is vertically supported proximate the opening 18 by the flexible substrate 50 and the plurality of stubs 24 that extend between the longitudinal gaps 26 of the flexible substrate 50 that are defined by the plurality of parallel support bands 22.

Referring now to the embodiments illustrated in FIGS. 6-13, the frame 52 of the armrest substrate 12 includes a first side 60 that is disposed proximate the door trim 16. A second side 62 of the frame 52 of the armrest substrate 12 is disposed proximate sheet metal inner of the door frame 14. When the door trim 16 and the first side 60 of the frame 52 are moved toward the sheet metal inner of the door frame 14 and the second side 62 of the frame 52, such as in a side impact collision or other lateral force 64 exerted on the vehicle door 30, the lateral support bands 22 compress toward one another, laterally. During this compression of the support bands 22, the stubs 24 disposed between the plurality of support bands 22 selectively disengage from at least one of the adjacent support bands 22 to allow the plurality of support bands 22 to slide laterally relative to the other support bands 22. In this manner, the armrest substrate 12 is substantially free of lateral support between the first and second sides 60, 62 from the parallel support bands 22 and the stubs 24 in a direction perpendicular to the longitudinal axis 20 of the opening 18.

Referring again to FIGS. 6-13, the plurality of stubs 24 that extend across each of the gaps 26 defined between the plurality of support bands 22 are positioned out of lateral alignment with the other stubs 24 in a direction perpendicular to the longitudinal axis 20 of the opening 18. In this manner, any vertical cross section taken perpendicular to the longitudinal axis 20 of opening 18 will cut through no more than one of the stubs 24. As a result of this configuration, each of the stubs 24 are prevented from providing additional lateral support, in lateral compression, to any of the other stubs 24 in the lateral direction. At the same time, each of the plurality of stubs 24 is configured to be sufficiently strong, under tension, in conjunction with the other stubs 24 to provide sufficient vertical support for the collapsible armrest 10 at the opening 18 such that a passenger's arm can rest upon the collapsible armrest 10 and receive sufficient vertical support. Additionally, the armrest substrate 12 is substantially flexible to provide cushioning to the occupant's arm. The configuration of the parallel support bands 22 and the plurality of stubs 24 is also configured to vertically support other substantially common loads experienced upon the collapsible armrest 10 during operation of the vehicle 32 such as forces experienced when objects are placed on the collapsible armrest 10, when the user enters and exits the vehicle 32, when the various utility features such as handles 40 or collapsible armrests 10 are used by the occupant of the vehicle 32, and other substantially common forces experienced by collapsible armrests 10.

Referring again to FIGS. 1-3, it is contemplated that the collapsible armrest 10 can include a frame deck 70 that extends between a portion of the door frame 14 and the door trim 16. In such an embodiment, the frame deck 70 includes at least one weakened portion 72, wherein the weakened portion 72 is adapted to bend, when the door trim 16 is moved toward the door frame 14 as a result of an impact condition or other lateral force 64 exerted on the vehicle door 30. It is contemplated that the frame deck 70 can be configured to add additional structural support to the armrest substrate 12. In various embodiments, it is contemplated that the armrest substrate 12 may be free of the frame deck 70, such that vertical support for the collapsible armrest 10 proximate the opening 18 is provided solely by the parallel support bands 22 of the armrest substrate 12. An inclined strap 74 that can extend from the frame deck 70 to a portion of the door frame 14 plays a significant role supporting the armrest substrate 12 and minimizes the vertical deflection of the armrest substrate 12, as well as reducing the stress produced from vertical load on the collapsible armrest 10. The stress recorded from vertical load tests are less than the armrest substrate yield strength. Therefore, no permanent deformation or marks should be identified on the collapsible armrest 10 under typical stresses.

Referring again to FIGS. 6 and 10, when the collapsible armrest 10 is in a resting position 80, such that no lateral forces 64 move the door frame 14 toward the door trim 16, or vice versa, the plurality of stubs 24 are aligned such that no more than one stub 24 is present in any cross-sectional line taken perpendicular to the longitudinal axis 20 of the opening 18. As discussed above, this configuration prevents any one of the stubs 24 from providing additional lateral compressive support to the other of the stubs 24. In this manner, lateral compressive support in a direction perpendicular to the longitudinal axis 20 of the opening 18 can be minimized such that the collapsible armrest 10 can collapse in a manner that is substantially unimpeded by the plurality of stubs 24.

Referring now to FIGS. 7-9 and 11-13, when one or more lateral forces 64 are exerted upon the collapsible armrest 10, such as in a side impact condition, the collapsible armrest 10 can be moved toward the occupant of the vehicle 32, such that the door trim 16 and the first side 60 of the armrest substrate 12 can come into contact with the occupant. The collapsible armrest 10 is configured to compress to a collapsed position 82 such that the door trim 16 moves toward a portion of the door frame 14, such as the sheet metal inner at the armrest substrate 12. When this occurs, one or more of the stubs 24 positioned between adjacent parallel support bands 22 disengage such that the parallel support bands 22 can slide laterally relative to one another. The parallel support bands 22 are also substantially flexible such that as the parallel support bands 22 slide relative to one another, each of the parallel support bands 22 can also flex, bend, twist, and otherwise be deformed to allow each of the parallel support bands 22 to move laterally relative to one another. As each of the parallel support bands 22 slides laterally relative to one another, one or more of the support bands 22 can either slide over or under an adjacent parallel support band 22 as the door trim 16 is moved toward the door frame 14 and the collapsible armrest 10 collapses.

Referring again to FIGS. 7-9 and 11-13, the collapsed position 82 can include any position where a portion of the door frame 14 and door trim 16 are moved toward each other as a result of a lateral force 64. Generally, the greater the lateral force 64, the greater the movement of the door trim 16 toward the door frame 14, or vice versa. In turn, the greater the movement between the door frame 14 and door trim 16, the greater the movement of the support bands 22 relative to one another. In this manner, there are several collapsed positions 82 where one or more support bands 22 move relative to the other support bands 22. By way of explanation, and not limitation, where a small lateral force 64 is exerted on the collapsible armrest 10, only the support band 22 nearest the door trim 16 will move toward the door frame 14. In this manner, only this support band 22 will slide or otherwise move relative to the other support bands 22. At the same time, one or more of the stubs 24 positioned between the two support bands 22 nearest the door trim 16 will disengage to allow for this movement. In the various embodiments, the greater the lateral force 64, the more support bands 22 will be deformed and the more stubs 24 will be disengaged to allow for the deformation of the support bands 22.

In the various embodiments, as illustrated in FIGS. 7-9 and 11-13, each of the stubs 24 is configured to disengage progressively during an impact situation such that the stubs 24 disposed proximate the door trim 16 disengage before the stub 24 is disposed proximate the door frame 14. This progressive disengagement allows for varying amounts of deformation of the collapsible armrest 10 and the various parallel support bands 22 that extend across the opening 18 of the collapsible armrest 10.

In the various embodiments, the lateral support bands 22 and the plurality of stubs 24 disposed between adjacent lateral support bands 22 are configured to provide various amounts of vertical deflection without the stubs 24 being disengaged from one or more of the parallel support bands 22. In this manner, the parallel support bands 22 and the stubs 24 are configured to provide a cushioning functionality for the collapsible armrest 10 at the opening 18, when the collapsible armrest 10 is in the resting state. By way of explanation, and not limitation, the amount of deflection provided by the parallel support bands 22 and the stubs 24 without the stubs 24 being disengaged from the parallel support bands 22 can be approximately 13 mm or less. In this manner, the stubs 24 are configured to be substantially stronger in tension when the vertical loads are placed upon the collapsible armrest 10, such that the stubs 24 can stretch between the parallel support bands 22 to accommodate vertical forces being placed upon the collapsible armrest 10. At the same time, each of the stubs 24 is configured to have less strength in a compressive direction when the parallel support bands 22 are moved toward one another, such as in a side impact collision situation, as discussed above. In this manner, the collapsible armrest 10 is able to receive vertical forces without the stubs 24 being disengaged, while allowing for the disengagement of the stubs 24 during a side impact situation to minimize lateral reinforcement between the parallel support bands 22 during an impact situation.

In the various embodiments, the collapsible armrest 10 can be utilized in various portions of the vehicle 32, including, but not limited to, the driver's-side door, the passenger-side door, rear doors, side panels adjacent seating with no adjacent door, and other similar locations.

In various embodiments, the collapsible armrest 10 can include a cushion disposed above the plurality of parallel support bands 22 to provide additional cushioning to the user of the collapsible armrest 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle armrest comprising:
   at least four longitudinal support bands continuously extending co-planar across an opening between a door frame and a door trim;

selectively detachable stubs extending across each gap defined between adjacent support bands, each stub being thinner than each support band, wherein each stub is free of alignment with each other of the stubs in a direction substantially perpendicular to the support bands; and
a deck extending across the opening and supporting the support bands from below and having a deflecting portion adapted to bend when the door trim moves toward the door frame.

2. The vehicle armrest of claim 1, wherein the opening includes a primary axis, and wherein the longitudinal support bands extend parallel with the primary axis.

3. The vehicle armrest of claim 1, further comprising:
a cover member extending over the longitudinal support bands, wherein the cover member is vertically supported by the longitudinal support bands proximate the opening.

4. The vehicle armrest of claim 1, further comprising:
a first side of an armrest substrate proximate the door trim;
a second side of the armrest substrate proximate a sheet metal inner of the door frame, wherein when the door trim and the first side are moved toward the sheet metal inner and second side, the stubs selectively disengage from one of the adjacent longitudinal support bands to allow the longitudinal support bands to slide laterally relative to one another, wherein the armrest substrate is free of lateral support between the first and second sides from the longitudinal support bands and the stubs.

5. The vehicle armrest of claim 1, wherein the longitudinal support bands include four support bands that define three gaps therebetween.

6. The vehicle armrest of claim 1, wherein the longitudinal support bands are plastic.

7. The vehicle armrest of claim 1, wherein the deck is plastic.

8. A vehicle armrest comprising:
four longitudinal support bands continuously extending co-planar across an opening positioned over a collapsible deck extending between a door frame and a door trim; and
a plurality of selectively detachable stubs extending across each gap defined between adjacent support bands, each stub being thinner than each support band and free of alignment with each other of the plurality of detachable stubs in a direction substantially perpendicular to the longitudinal support bands, wherein the collapsible deck supports the support bands and a portion of the detachable stubs from below.

9. The vehicle armrest of claim 8, wherein the collapsible deck includes a deflecting portion, the collapsible deck adapted to bend at the deflecting portion when the door trim is moved toward the door frame.

10. The vehicle armrest of claim 8, wherein the opening is further defined between the door trim and the door frame.

11. The vehicle armrest of claim 8, wherein when the door trim moves toward the door frame, the detachable stubs selectively disengage from one of the adjacent longitudinal support bands to allow the longitudinal support bands to slide laterally relative to one another.

12. The vehicle armrest of claim 8, wherein the longitudinal support bands are plastic.

13. A collapsible vehicle armrest comprising:
an armrest substrate extending between a door frame and a door trim and defining an opening therebetween, the opening having a longitudinal axis substantially parallel with the door frame, and wherein a collapsible frame strap extends across the opening, the collapsible frame strap having an inclined strap and a weakened portion defined therein;
at least four continuous support bands extending substantially co-planar across the opening and parallel with the longitudinal axis, the support bands positioned over the collapsible frame strap, wherein the collapsible frame strap engages the support bands from below and within the opening, and wherein the collapsible frame strap is configured to resist vertical deflection of the support bands into the opening; and
a plurality of selectively detachable stubs extending across each gap defined between adjacent continuous support bands, each stub being thinner than the support bands, each gap extending through the support bands and across the opening, and wherein each support band is separated from the other of the support bands except at the stubs.

14. The collapsible vehicle armrest of claim 13, wherein each stub is free of alignment with each other of the plurality of stubs in a direction substantially perpendicular to the plurality of continuous support bands.

15. The collapsible vehicle armrest of claim 13, wherein the collapsible frame strap extends between the door frame and the door trim.

16. The collapsible vehicle armrest of claim 13, further comprising:
a cover member extending over the armrest substrate and the plurality of continuous support bands, wherein the cover member is vertically supported proximate the opening by the plurality of continuous support bands and the plurality of stubs.

17. The collapsible vehicle armrest of claim 13, further comprising:
a first side of the armrest substrate proximate the door trim;
a second side of the armrest substrate proximate a sheet metal inner of the door frame, wherein when the door trim and the first side are moved toward the sheet metal inner and second side, the stubs selectively disengage from one of the adjacent continuous support bands to allow the continuous support bands to slide laterally relative to one another, wherein the armrest substrate is free of lateral support between the first and second sides from the continuous support bands and the stubs.

18. The collapsible vehicle armrest of claim 13, wherein the collapsible frame strap is plastic.

19. The collapsible vehicle armrest of claim 13, wherein the collapsible frame strap extends at an inclined angle from a frame deck to a portion of the door frame, the collapsible frame strap and the frame deck cooperating to define a deflecting portion of the armrest substrate.

* * * * *